Jan. 21, 1947.  G. A. GOEPFRICH  2,414,593
ACCUMULATOR SYSTEM
Filed Sept. 26, 1942
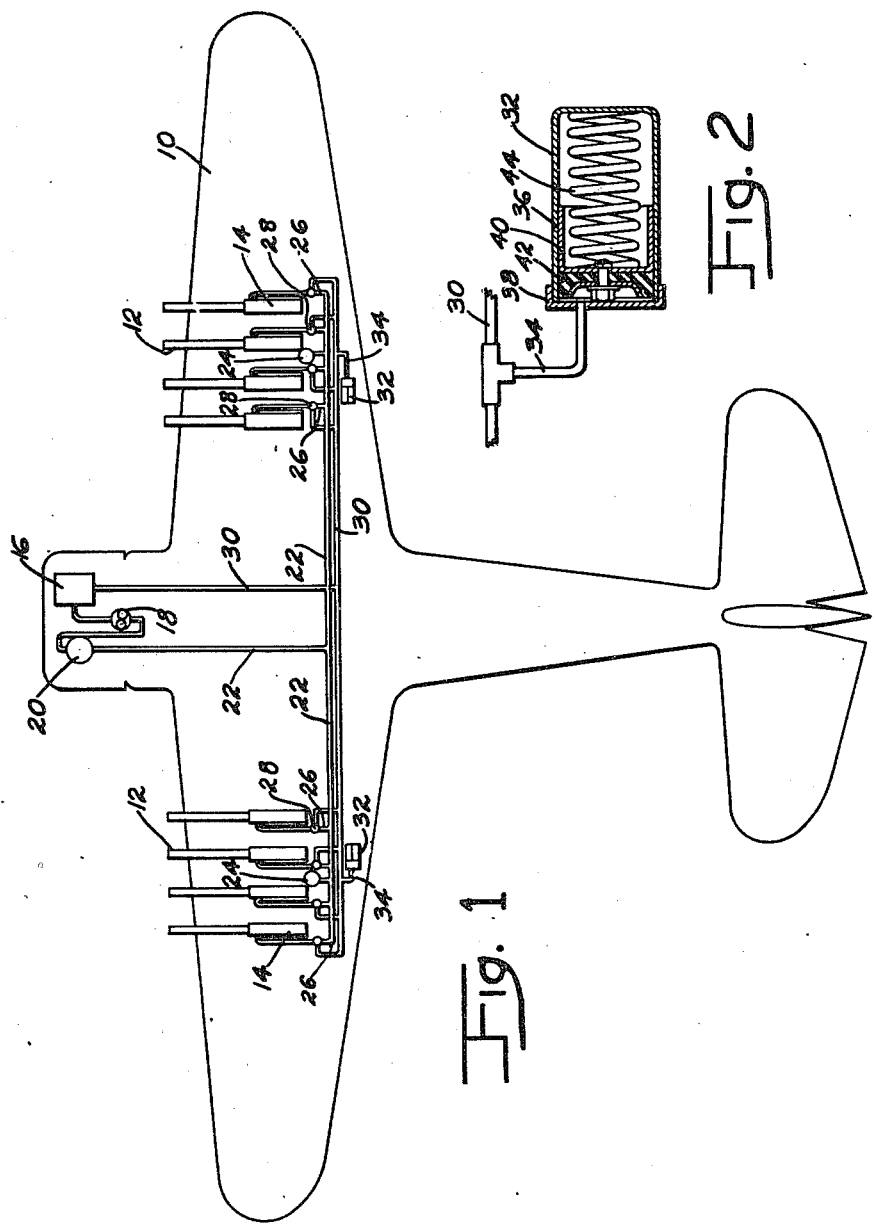
INVENTOR.
GEORGE A. GOEPFRICH
BY Patented Jan. 21, 1947

2,414,593

UNITED STATES PATENT OFFICE 2,414,593

ACCUMULATOR SYSTEM

George A. Goepfrich, South Bend, Ind., assignor to Bendix Aviation Corporation, South Bend, Ind., a corporation of Delaware Application September 26, 1942, Serial No. 459,806

3 Claims. (Cl. 60—51)

This invention relates generally to improvements in fluid pressure systems, and more particularly to fluid pressure systems for aircraft where a number of fluid motors are located remotely from a source of fluid which is maintained at a predetermined pressure by a pump which is generally attached to a power take-off from an aircraft engine, and which withdraws fluid from a reservoir and places it under pressure in an accumulator.

In such fluid pressure systems, wherein the fluid is maintained generally at a pressure in the neighborhood of from 800 to 1000 pounds per square inch, the problem of frictional and head losses in the conduits which supply fluid under pressure to various fluid operated motors is critically important. The frictional losses developed in such conduits result in operating pressures at the fluid operated motors which may reach a value so low that the motors cannot operate properly. Hence, if rapid operation is desired the head losses in the system must be kept to a minimum.

Another problem attendant upon the use of fluid pressure systems has been the resultant falling off of pressure when a large number of fluid motors are operated simultaneously, or so closely together that the accumulator cannot maintain the pressure in the system at the required amount.

In modern aircraft, which fly at altitudes where the outside temperatures may be in the neighborhood of −20° Fahrenheit or lower the fluid in the pressure systems provided in such aircraft becomes quite viscous as it approaches the temperature of the outside air. This increased viscosity creates increased head losses in the system, thereby preventing proper operation of the fluid motors.

Many expedients have been proposed as a solution of the problem. One such expedient has been the heating of the fluid, whereby its viscosity will be diminished and the ease of flow be increased. Such a proposal makes necessary the provision of intricate and costly heat exchange devices which add considerably to the weight of an aircraft. Obviously it is difficult to maintain the temperature of the fluid, particularly where fluid motors are remotely located from the heat exchange device, and particularly where the fluid motors may be infrequently used. Another expedient proposed has been that of maintaining a number of fluid pressure systems, to be located and operated immediately adjacent to the fluid motors. Such a proposal naturally results in increased cost, weight, and maintenance, since a number of such systems must be provided.

It has become the practice to use fluid pressure systems both for the manual charging of machine guns and the automatic charging of machine guns. Such systems have been described and claimed in White et al. application Serial No. 311,978 (now Patent No. 2,332,419, dated Oct. 19, 1943) and Pontius et al. application Serial No. 371,742. Both of these applications disclose the use of a hydraulic machine gun charging cylinder connected to a source of fluid under pressure provided by a closed fluid pressure system. This invention comprehends an improvement in such a fluid pressure system and is shown particularly with reference to the application thereof to such a machine gun charging system.

With the foregoing and other objects in mind it is an object of this invention to provide a fluid pressure system wherein the fluid is maintained at proper pressure adjacent fluid operated motors.

Another object is to provide a fluid pressure system with means which will insure the unimpeded flow of fluid to the return branches of the pressure system.

A still further object is to provide an auxiliary reservoir for the retention of fluid until it can be returned to the main reservoir.

Yet another object is to provide a secondary accumulator adjacent the fluid operated motors for insuring an adequate supply of fluid for their rapid operation under all conditions.

A still further object is to provide fluid pressure systems for fluid operated motors wherein the back pressure in the line returning fluid to the reservoir will not interfere with the operation of the motors.

Other objects and advantages of this invention will be apparent from a study of the following description in which:

Figure 1 shows a schematic arrangement of the fluid pressure system as applied to a plurality of machine guns mounted in a military aircraft; and Figure 2 is a detailed longitudinal cross section of a secondary reservoir comprising a part of the invention.

While the invention is described with reference to an automatic machine gun charging system it is not limited in scope to the use shown, the scope of the invention being limited only by terms of the claims appended hereto.

With reference to Figure 1 there is shown a military aircraft 10 having mounted in the wings thereof a plurality of machine guns 12 in the manner known to those skilled in the aircraft art. The machine guns 12 are each provided with a charging cylinder 14 for retracting the bolt (not shown) and freeing it for counter-movement in the event the gun becomes jammed by faulty ammunition or for some other reason. Fluid for the operation of the charging cylinders 14 is provided by a fluid pressure system as shown which consists of a main reservoir 16 and a pump 18 which is generally driven by the airplane engine through some suitable power take-off for forcing fluid under pressure to an accumulator 20, which is connected by a conduit 22 to a secondary accumulator 24 located adjacent the fluid motors 14, which in the embodiment shown are the charger motors 14 mounted on machine guns 12. Accumulators 20 and 24 may be of any type known in the aircraft art, and each may consist of a closed cylinder having therein a floating spring-loaded piston for maintaining the desired pressure on the fluid in the cylinder, or each may consist of a closed cylinder having therein a flexible diaphragm which separates a confined volume of gas from the fluid, the confined gas maintaining the pressure on the fluid and being expansible according to the demands for fluid placed on the accumulator.

Branching from conduit 22 and adjacent the machine guns 12 are a plurality of conduits 26 each of which at times supplies fluid to a charging cylinder 14 past a valve 28 which may be of the solenoid pilot valve type disclosed in Pontius et al. application Serial No. 371,742.

Fluid is returned from the charging cylinders 14 past the valve 28 and into a return conduit 30. Return conduit 30 is connected to the main reservoir 16 thereby providing a closed fluid pressure system in the manner known to the art. Adjacent the charging motors 14 and the auxiliary accumulator 24 is positioned a secondary reservoir 32 which is connected to the fluid return line 30 by means of a conduit 34. With reference to Figure 2 the secondary reservoir consists of a cylindrical body 36 which is closed at one end by a cup-shaped member 38 which is provided with a suitable connection and opening to the conduit 34. A piston 40 is reciprocable within the cylinder body 36, and carries a packing 42 which is secured to the piston 40 by any suitable means such as a bolt, washer and nut as shown. The piston 36 is normally biased to the left by a spring 44 which serves to place a pressure on the fluid returning in the line 30. While the secondary reservoir has been shown as of the piston type, a reservoir having a "sock" diaphragm for separating a body of gas from the fluid may be used quite as well.

The operation of the system described above is as follows. Fluid which is placed under pressure by the pump 18 is stored in accumulator 20 and the auxiliary accumulator 24. At such times the charger motors 14 are operated by the opening of the valve 28 fluid will be supplied to the motor at a pressure which will be that present in the auxiliary accumulator 24 less any small frictional losses in the conduit between the auxiliary accumulator 24 and the charging cylinder 14. At the completion of any charging cycle, when fluid is returned past the solenoid valve 28 and into the return line 30, the fluid first is retained in the secondary reservoir 32 and any pressure in the fluid exhausted from the charging cylinders 14 will serve to compress the spring 44, which ordinarily puts a back pressure on the returning fluid to the reservoir 16 of about 10 pounds per square inch. At the completion of any charging cycle, the fluid is stored in the secondary reservoir 32, thereby preventing any appreciable back pressure on the charging cylinder, insuring that the cylinder 14 can rapidly evacuate its fluid. The spring 44 which has been loaded by the fluid escaping from the charging cylinder 14 can then be passed to the main reservoir 16 with a minimum amount of head loss or back pressure.

From the foregoing description it will be apparent that the system described insures the presence of a source of fluid under pressure which is readily available at all times to the fluid motors. The arrangement shown will insure that the fluid returning from the fluid motors at the completion of a cycle thereof can be temporarily retained in a reservoir with a minimum amount of back pressure, thereby insuring that the motors can operate with a maximum speed. The arrangement shown permits the use of a single fluid pressure system, the auxiliary accumulator at each fluid motor being maintained in a charged condition for the use of its adjacent fluid motor.

While this invention has been described with reference to a preferred embodiment thereof, the scope is to be in nowise limited to the embodiment shown, nor otherwise than by the terms of the claims appended hereto.

I claim:

1. A fluid pressure system comprising a reservoir, a pump connected to said reservoir, a fluid motor remotely located from the reservoir and having an exhaust outlet connected to said reservoir, a pair of accumulators connected to the system between the pump and fluid motor and constituted to be put under pressure by said pump, one of said accumulators being located adjacent said pump and connected thereto and to said other accumulator, said other accumulator being located adjacent said fluid motor and constructed and arranged in the system so that the fluid pressure supplied to said motor from said other accumulator is substantially the same as the fluid pressure in said one accumulator, and an auxiliary reservoir connected to said exhaust outlet and to said first-mentioned reservoir and constructed and arranged to absorb the exhaust fluid to reduce the back pressure on said motor.

2. A fluid pressure system comprising a reservoir, a pump, a main accumulator for receiving fluid under pressure from said pump, a plurality of fluid motors remotely located from the pump and from each other and each having an exhaust outlet, a plurality of auxiliary accumulators, one adjacent each of said motors and connected in the system between its associated motor and the main accumulator and constructed and arranged to store fluid under pressure, said auxiliary accumulators being constructed and arranged in the system so that the fluid pressure supplied to their associated motors is substantially the same as the fluid pressure in said main accumulator, and an auxiliary reservoir located adjacent each motor and connected to the exhaust outlet of its associated motor and to the main reservoir, said auxiliary reservoir being constructed and arranged to absorb the exhaust fluid to reduce the back pressure on said motor.

3. A fluid pressure system comprising a reservoir, a pump, a main accumulator for receiving fluid under pressure from said pump, a plurality of groups of adjacently disposed fluid motors, the groups being remotely disposed from the pump and from each other, and a plurality of auxiliary accumulators, one adjacent each group of motors and connected between its associated group of motors and the main accumulator, said auxiliary accumulators being constructed and arranged in the system so that the fluid pressure supplied to their associated groups of motors is substantially the same as the fluid pressure in said main accumulator.

GEORGE A. GOEPFRICH.